Sept. 9, 1947.　　　　H. O. WILLIAMS　　　　2,427,172
MULTIPLE V-BELT PULLEY
Filed Dec. 31, 1943　　　4 Sheets-Sheet 1

Inventor
HOWARD O. WILLIAMS

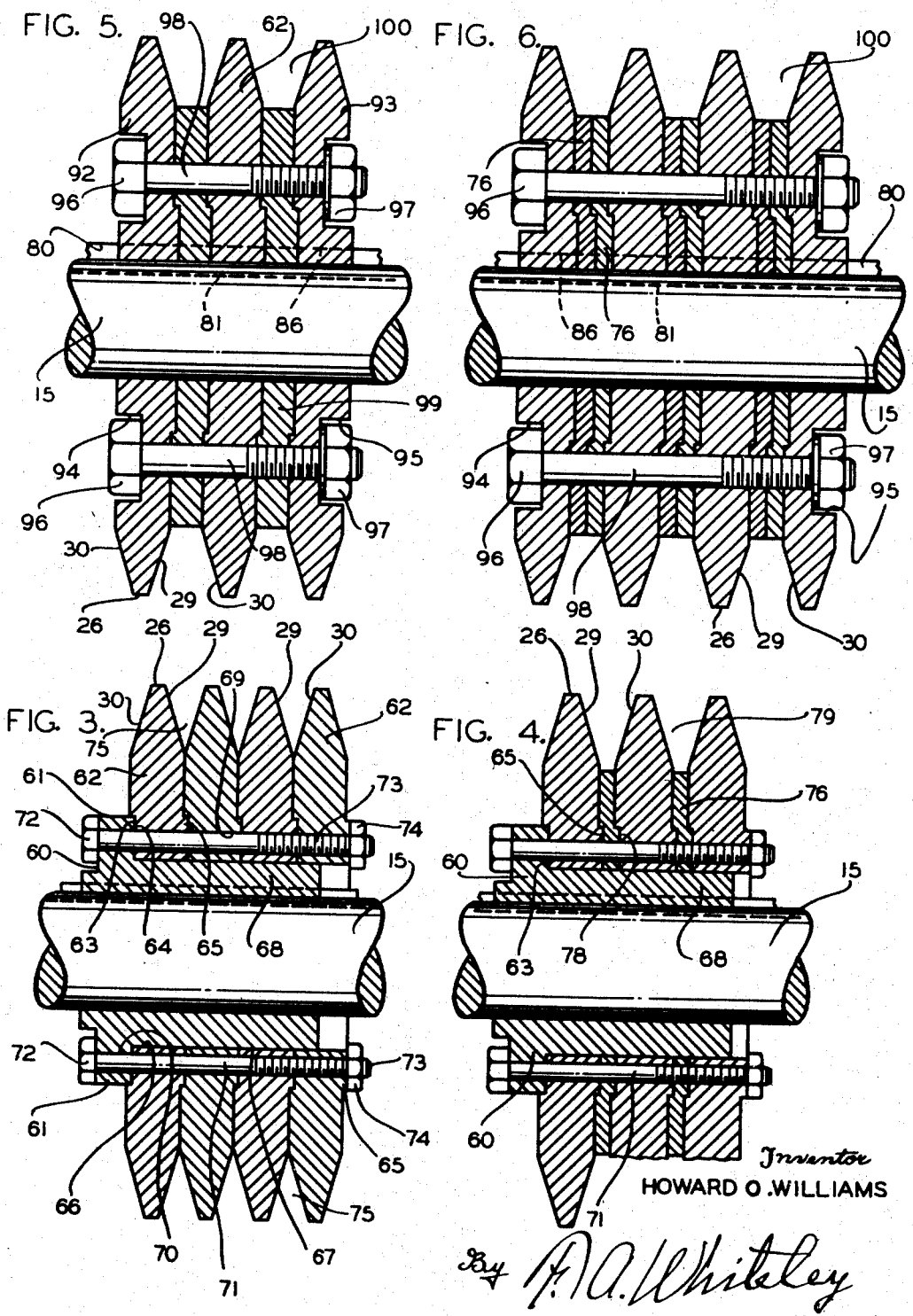

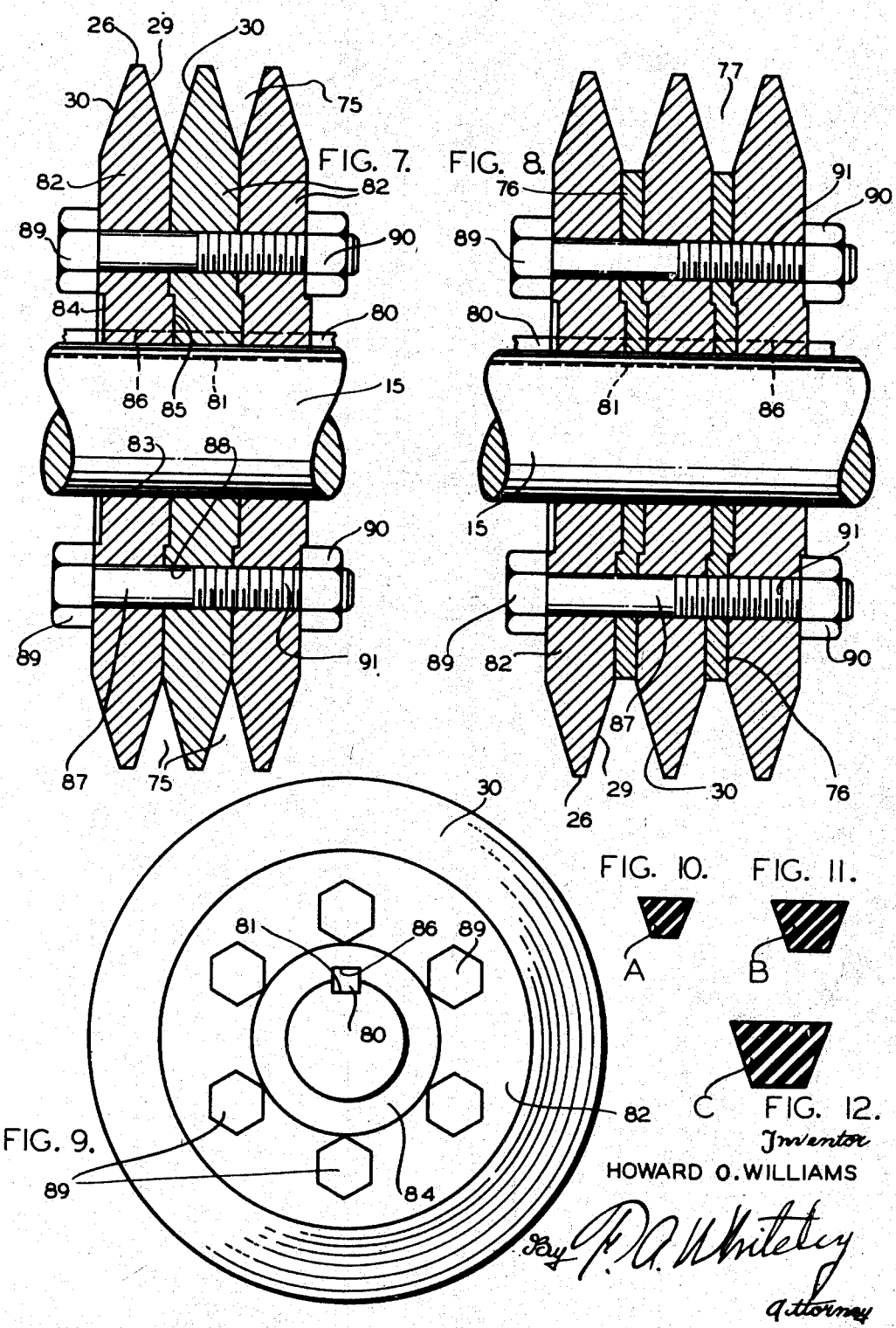

Sept. 9, 1947.                    H. O. WILLIAMS                    2,427,172
                              MULTIPLE V-BELT PULLEY
                              Filed Dec. 31, 1943                4 Sheets-Sheet 4
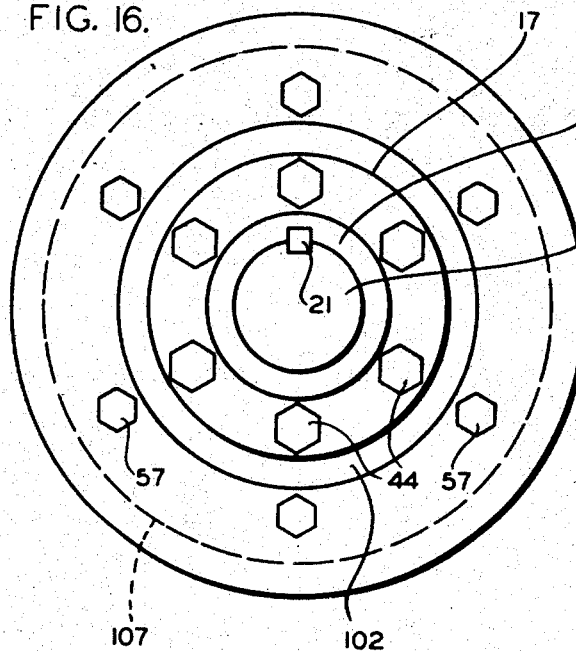
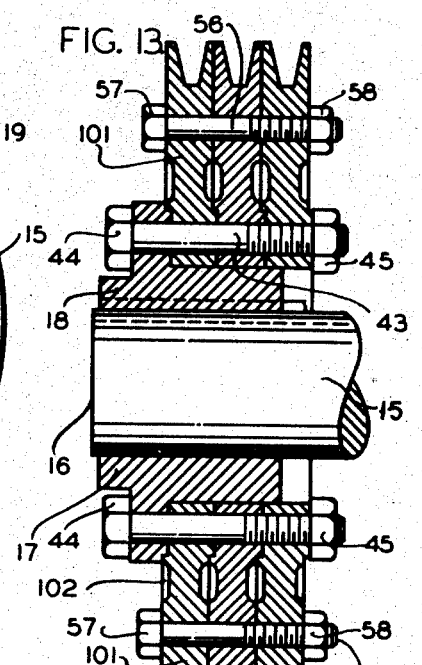
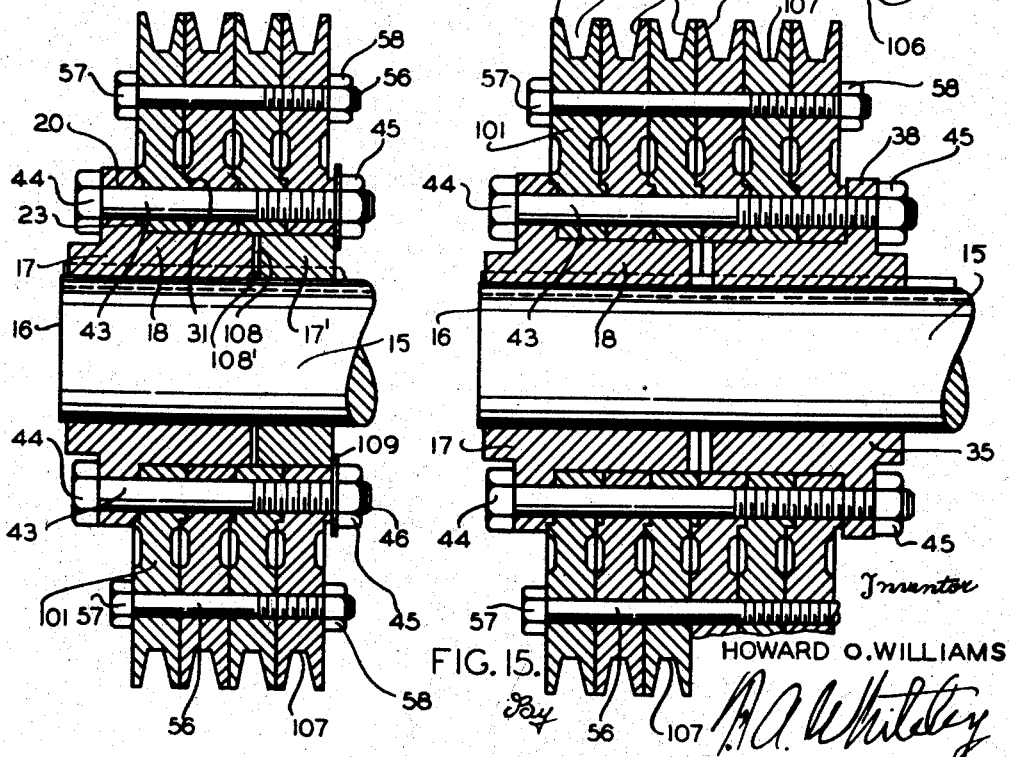
HOWARD O. WILLIAMS
Inventor Patented Sept. 9, 1947

2,427,172

UNITED STATES PATENT OFFICE 2,427,172

MULTIPLE V-BELT PULLEY

Howard O. Williams, Minneapolis, Minn.

Application December 31, 1943, Serial No. 516,553

6 Claims. (Cl. 74—230.1)

1

My invention relates to multiple V-belt pulleys and the method of forming same, and has for its purpose to provide a V-belt pulley which with a single basic casting may simply and readily be assembled with as many belt grooves thereon as is desired. Also in one of its forms the belt grooves may be varied in width to receive belts of differing sizes.

In many types of driven machinery the drive is effected by a multiplicity of what are known as V-belts running over pulley members having generally, and broadly considered, V-type annular grooves for receiving the V-belt. In practice the V-belt ordinarily is rhomboidal in shape instead of a true V, and the frictional driving contact with the pulley is made by the obliquely disposed outwardly diverging sides of the belt. The V-belts also are of different sizes according to the load placed upon them, but in all cases the driving contact is made with the obliquely disposed side walls of the belt, in this respect differing from ordinary flat belts where the driving contact is made with the full face of the belt.

Since the V-belts are of different sizes, the belt grooves must be correspondingly of different sizes. The differences, both as to belts and grooves, are generally found in the overall width of the belt and corresponding width of the groove, that is in the spacing of the oblique walls diverging outwardly in the grooves and contracting inwardly in the belts. These differences, that is that anywhere from two to five or more belts and sets of grooves may be employed and from one to four or more different widths of belts and grooves may be employed, have resulted in the necessity of having a large number of patterns or dies, greatly adding to the expense of manufacturing and maintaining a stock of pulleys and belts to meet the requirements of the several sets and sizes, and equally adding to the cost of replacement when a part of such a pulley is broken.

I have discovered that by the use of a hub splined on the drive shaft and having an integral securing flange and by providing separate pulley discs, the same may be secured to the hub and the V-groove or grooves be formed by bolting together on the hub two or more of these discs depending upon the number of V-grooves which are required.

2

The hub member may be long enough to provide for holding a predetermined number of pulley discs, and for larger pulleys, that is pulleys with a larger number of V-grooves, sectional hubs can be added with or without an additional securing flange.

I have also discovered that with the use of such pulley discs, washer-like spacers may be applied between pairs of said discs to change the width of the pulley grooves to accommodate them to different sizes of V-belts. The spacers may themselves be of sufficient differing widths to provide the necessary separation of the walls of the pulley discs or a plurality of smaller spacers may be used for that purpose.

It is a principal object of my invention, therefore, to provide a multiple groove pulley wherein a greater or less number of groove making elements will be rigidly secured to the drive shaft, the number of V-grooves being variable to a greater or less degree as the instrumentalities to be driven may require.

It is a further object of my invention to provide a multiple V-belt pulley wherein there is splined to the driving shaft a hub provided with an annular securing flange, in combination with a multiplicity of groove-forming members, said members being bolted together and also bolted to the flange of the hub.

It is a further object of my invention, in combination with a hub secured to the driving shaft and having an annular securing flange, to provide a multiplicity of groove-forming members mounted on the hub and bolted thereto, and also to provide hub extensions whereby application of identical additional groove-forming members may be made to suitably increase the number of V-grooves of the pulley.

It is a further object of my invention, where hub extensions are employed for a considerable number of added groove making members, to form the hub extension with an annular flange and to secure the groove making members to the hub and hub extension by bolts passing through the flanges on both the hub and the hub extension.

It is a further object of my invention to provide grooved discs adapted to be bolted together and to be bolted to a hub flange for providing a V-belt pulley and to use as many of said groove members as may be requisite to provide a multiple V-belt pulley with the number of V-grooves required.

It is a further object of my invention to employ groove-making discs having bevelled faces diverging from the annular edge of and adjacent the transverse central planes of the discs and mounting said discs upon a drive shaft or a hub on the drive shaft, with washer-like spacers between them, whereby a broadened V-groove is obtained.

It is a further object of my invention to form the faces of the groove-making discs with a depressed annular portion on one side and a protruding annular portion on the other side, correspondingly adapted to fit together, and to secure said groove-making discs together with the protruded portions fitted into the depressed portions, and to secure such an assembled group of groove-making discs to a drive shaft or to a hub or set of hubs fast on a drive shaft.

It is a further object of my invention to employ groove-making discs having bevelled faces diverging inwardly from the annular edge of and adjacent the transverse central planes of the discs and mounting said discs upon a drive shaft or hub on the drive shaft with a desired number of washer-like spacers between them whereby a broadened V-groove of any desired breadth is obtained.

The full objects and advantages of my invention will appear in connection with the detailed description thereof which will now be given in the following specification, and the novel features of the invention from which are obtained the aforementioned advantageous results and improved structures will be particularly pointed out in the claims.

In the drawings illustrating applications of my invention in one form:

Fig. 3 is a longitudinal sectional view through a multiple V-belt pulley, showing a series of specially formed groove-making discs secured to the flange of a hub on a drive shaft to make up a series of V-grooves.

Fig. 4 illustrates a similar arrangement in which the V-grooves are widened by the use of spacers of a distinctive shape.

Fig. 5 is a view of a series of discs having annular depressed and offset portions and intervening spacers of a greater width than those disclosed in Fig. 4, whereby the V-groove is still further widened.

Fig. 6 is a sectional view similar to Fig. 5 wherein the double spacing effect is brought about by the use of a pair of spacers similar to those shown in Fig. 4.

Fig. 7 is a sectional view similar to Fig. 3 wherein the parts are held together with the use of a hub on the drive shaft.

Fig. 8 is a sectional view similar to Fig. 7 with spacer plates applied between the groove-forming discs which have an annular protruding portion at one side and a corresponding annular depressed portion at the other side.

Fig. 9 is an end elevation view of the parts shown in Figs. 7 and 8.

Figs. 10, 11, and 12 are cross-sectional views of standard V-belts of three common sizes.

Fig. 13 is a longitudinal sectional view of a multiple V-belt pulley formed of a series of complete V-groove elements secured to the drive shaft through a single hub thereon.

Fig. 14 is a sectional view similar to the section of Fig. 13 showing a hub extension for permitting the securing of a multiplicity of groove-forming members to a driving shaft.

Fig. 15 is a sectional view similar to Figs. 13 and 14 wherein the hub extension is itself provided with an annular flange and the inner margins of the hubs are held slightly spaced from one another for providing a V-belt pulley of a large number of V-drive grooves.

Fig. 16 is an end elevation view of the drive pulley arrangement shown in either Fig. 13, 14, or 15.

Figures 2, 17:
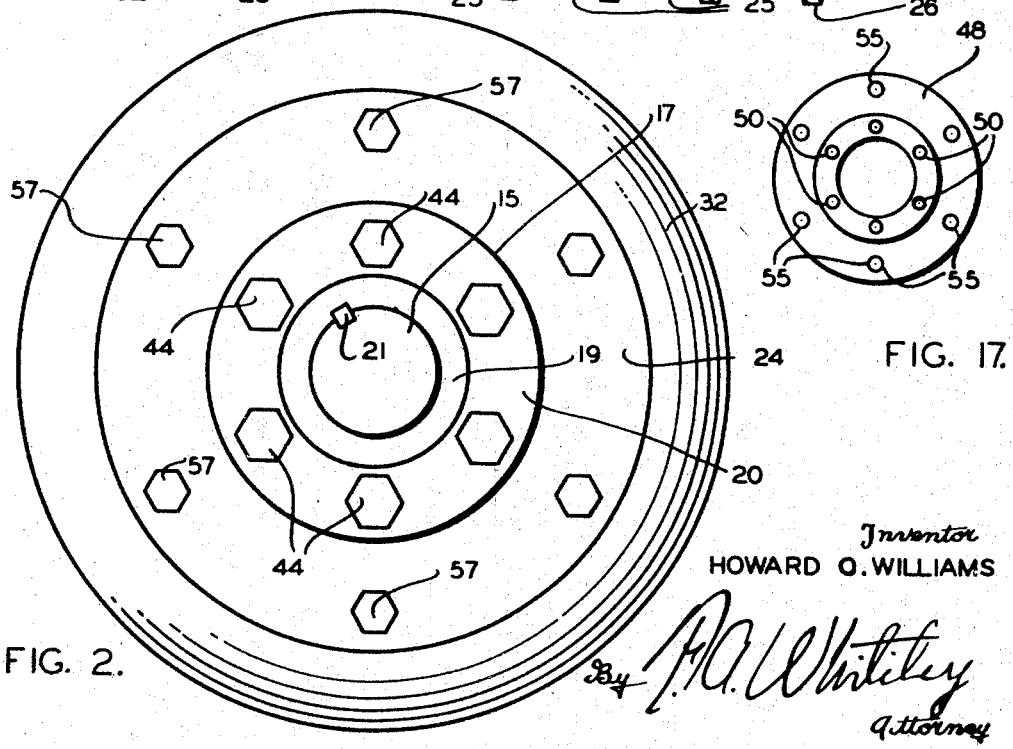
Fig. 2 is an end view of the parts shown in Fig. 1.

Fig. 17 is a plan view on a reduced scale of one of the spacing washers.

Figure 1:
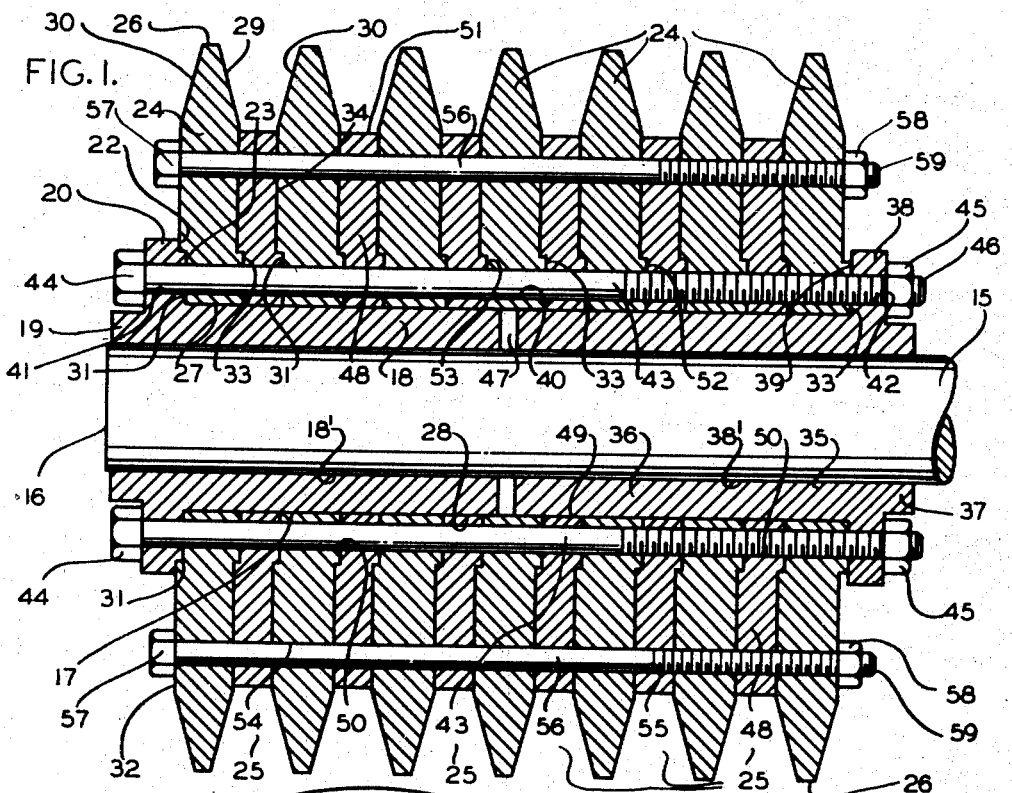
Fig. 1 is a longitudinal sectional view of a multiple feed belt drive pulley in a preferred form of the invention.

Referring first to Figs. 1 and 2, 15 is any driven shaft, which may be mounted in any desired relation to operate any of numerous different forms of devices, such for example as grain cleaning machines of one type and another. At one end 16 of shaft 15, as shown, or in practice to any desired point along the length of the drive shaft, is keyed a hub 17. This hub, as best shown in Figs. 2 and 14, is provided with a cylindrical body portion 18 with an annular front projection 19 and an annular outwardly extending circumferential flange 20. The sleeve 18 is keyed to the shaft 15 as indicated at 21 in Figs. 2 and 6. A flange 20 in the form of Fig. 1 is provided with an annular cut-out portion indicated at 22 in Fig. 1 which leaves an annular extruded rim 23 surrounded by the annular cut-out portion 22.

Upon the sleeve 18 of the hub 17 is mounted a series of groove-making discs 24. In the form of the invention shown in Fig. 1 there are seven of such groove-making discs which produce six V-grooves 25. The several groove-making discs 24 are identical in construction. Each of them is formed by a body portion with a cylindrical outer rim 26 and with a circular inner opening 27 adapted to engage and seat closely upon the outer circumferential area 28 of the hub sleeve 18.

Each of the groove-making discs 24 is provided with obliquely disposed faces 29 and 30 which diverge inwardly from the edges of the cylindrical outer rim 26, and which are symmetrically disposed with respect to the central transverse plane of the groove-making discs 24.

Disc 24 is also provided with an annular cut-out portion 31, Fig. 1, which is adapted to receive the projected portion 23 of the hub-flange 20, as clearly indicated in Figs. 1, 3, and 4. The cut-out portion 31 is formed through the outer face 32 of the disc 24, and the inner part thereof extends inwardly into the hub-receiving hole 27. The disc 24 likewise has an outwardly projected portion 33 extending from the inner face 34 of the disc 24 of a size and position complementary to those of the cut-out portion 31. The cut-out portion 31 is also of the same size and position of the protruded portion 23 of the annular hub flange 20 so that such protruded portion may be fitted into the cut-out portion 31 of an initial groove-forming disc 24, as clearly shown in Figs. 1, 3, and 4. It also follows that each of the protruded annular portions 33 of the groove-forming discs 24 is adapted to seat and fit closely in the cut-out portions 31 of a succeeding disc 24.

In the form of the invention shown in Figs. 1 and 2 there is a symmetrically disposed complementary hub member 35. This has a sleeve portion 36, and an extension 37 thereof with a central shaft-receiving hole 38' which are substantially the same as the sleeve 18, the extension 19, and the shaft-receiving hole 18' of the hub member 17. The hub 35 has an integrally formed annular flange 38 which differs from the flange 20 on the hub 17, for the flange 38 has no annular cut-out part 22 or annular extended part 23 but is provided with a straight inner wall 39 which receives directly against it the protruded portion 33 of the groove-forming disc 24.

In an assemblage of the type disclosed in Fig. 1 there must be a very firm and unyielding hold of the parts together. This is effected by two sets of powerful bolts. Each of the groove-making members 24 is provided with a bolt-hole 40. The several bolt-holes 40 are so positioned adjacent the inner circumferential holes 27 of groove-forming members 24 that when they are assembled upon hub member 17 and extension hub member 35, when that is used, they will come into alignment and also will be in alignment with similar bolt holes 41 in flange 20 of hub member 17 and bolt holes 42 in flange 38 of hub member 35. Large bolts 43 provided with integral heads 44 extend through the holes in the groove-making discs 24 and the flanges 20 and 38 where the double hub arrangement is used, as shown in Fig. 1. Nuts 45 are screwed on the threaded ends 46 of the bolts 43.

The length of the hub member sleeves is so proportioned to the breadth of the entire assemblage that the inner ends of the hub sleeves are spaced apart as shown at 47 in Fig. 1. There are a multiplicity of bolts 43 with their integral heads 44, as shown in Fig. 2. It follows that when the nuts 45 are turned up on the threaded ends 46 of bolts 43, pressure will be exerted upon the flange 20 of hub 17 and the flange 38 of hub 35. This pressure will be equally distributed about the shaft 15, and since the two hub members 17 and 35 can move toward each other because of the space 47 between their ends, the pressure is exerted uniformly upon the entire group of groove-forming members 24, thus very firmly uniting them with the hub members 17 and 35 which are splined on the shaft 15.

Where no spacers are present between groove-forming members 24 the result will be a simple V-groove, as shown in Fig. 3. This groove would be adapted to receive the smallest V-belt such as V-belt A shown in Fig. 10. However, as illustrated in Fig. 1, spacers 48 are employed which separate the groove-forming discs 24 a sufficient distance to receive a considerably larger size V-belt such as the belt designated as C in Fig. 12. As best shown in Figs. 1 and 7, these spacers are washer-like members formed with a central circular hole 49 of a diameter equal to that of the hub 17 or hubs 17 and 35, or of a lone shaft 45 upon which the spacers may be positioned. These spacers, like the groove-forming discs 24, are provided with bolt holes 50 adapted to receive the bolts 43. The outer surface of the spacers, indicated at 51, is a cylinder of a diameter such that the spacers lie between the body portions of groove-forming discs 24 reaching only to the beginning of the oblique side walls 29 and 30 thereof. The spacers also are formed with cut-out portions 52 and protruded portions 53. The cut-out portions 52 of the spacers 48 receive the protruded portions 33 of the groove-forming discs 24. Likewise the protruded portions 53 of the spacers 48 enter and are received by the cut-out portions 23 of the groove-making disc 24.

The groove-making discs 24 are provided with additional aligned bolt holes 54 and the spacer discs are likewise provided with correspondingly sized and positioned bolt holes 55. An additional series of bolts 56 provided with heads 57 clamps the members together at a point adjacent the obliquely disposed walls 29 and 30 of the groove-making discs 24 by means of a nut 58 screwed on a threaded end 59 of bolt 56.

Referring to Figs. 3 and 4, a multiple V-groove pulley of the simplest type with three grooves is shown. The shaft 15 has splined thereon a relatively short hub 60 which is provided with an annular flange 61. A series of groove-forming discs 62 are applied to the hub 60 and have the same cylindrical outer rims 26 and sloping side walls 29 and 30 as are present in the discs 24 heretofore described. These discs have an annular cut-out portion 63 adapted to seat upon the annular inside wall 64 of the flange 61. The discs 62 also have an annular protruded portion 65 which is adapted to seat in the cut-out portions 63 of succeeding groove-forming discs 62.

These groove-forming discs are provided with a circular opening or hole 66 which fits closely the outer circumference 67 of the cylindrical body portion 68 of the hub 60. The discs 62 are provided with bolt holes 69 which are adapted to align with a bolt hole 70 in the flange 61. Strong bolts 71 are provided with heads 72 engageable with the flange 61. These bolts extend through the flange hole 70 and the bolt holes 69. The bolts 71 are provided with threaded ends 73 upon which are screwed nuts 74 engageable directly with the projecting portion 65 of the last groove-forming disc 62.

The groove-forming discs 62 differ from the discs 24 in that they have no second set of bolt holes and are not secured by a second set of bolts such as the bolts 56 of Figs. 1 and 2. Also, as shown in Fig. 3, there are no spacers, the grooves 75 being formed by direct contact of the walls of the groove-forming disc 62. The grooves 75 are thus fully V-shaped and are adapted to receive the smallest type V-belt A shown in Fig. 10.

Such a pulley will in general not be provided with more than two or three grooves 75 and hence will be mounted upon a single hub. The nuts 74, of which there are the same number as is shown in Figs. 2 and 9, engaging the annular protruded portion 65, are adapted to draw the groove-forming discs 62 tightly against the flanges 61, thus making a relatively light and cheap multiple V-belt pulley for effective use in the lighter type of driving work.

The groove-making discs of Fig. 4 are identically the same as the groove-making discs of Fig. 3 and need not further be described. The construction of Fig. 4 so far as the mounting of hub 60 upon shaft 15 is identically the same as in Fig. 3. Fig. 4, however, illustrates the use of spacers 76 which are formed with annular depressed portions 78 which engage and match into the annular recessed portions 63 and protruding portions 65 as shown in Fig. 4. This arrangement forms a groove 79 wider than the groove 75 which is adapted to receive and be driven by a medium sized V-belt, such as the belt B of Fig. 11.

In the form of the invention of Figs. 5, 6, 7, and 8, no hubs are employed. The groove-forming discs are united directly to the drive shaft 15 by means of a spline 80 which, as clearly shown, seats in a longitudinal groove indicated by dotted lines at 81. This spline, as clearly shown, has a considerable part of its body outside the circumferential limits of the shaft 15. This extended portion of the spline is seated in transverse grooves on the inner edges across the circumferential margins of the groove-forming discs or of those discs and any spacers which may be used between pairs of discs.

As shown in its simplest form in Fig. 7, groove-forming discs 82 have cylindrical top margins 26 and oblique side walls 29 and 30 similar to the outer margin and oblique side walls of the groove-forming discs 24 and 62 heretofore described. The groove forming discs are provided with central openings or holes 83 which receive directly the drive shaft 15. Otherwise the groove-forming discs 82 are quite similar to the groove-forming discs 62. They have annular cut-out portions 84 and annular extended portions 85 mutually engaging and fitting in one another in the same manner, except that these portions run down to the shaft 15 itself rather than to a cylindrical sleeve portion of a hub, such as body portions 68 of hub 60.

There also are transverse aligned grooves across the inner faces of the groove-making discs 82 cut in through the cylindrical surfaces 83, which are indicated in dotted lines at 86, there being a multiplicity of groove-forming discs 82 (as shown in Fig. 7, three in number). These discs are held, with adjacent faces of pairs thereof in contact and with the protruding portions 85 seated in the cut-out portions 84, by means of bolts 87, which extend through aligned openings 88 in the groove-forming discs 82 and engage with heads 89 the outside face of the first of such groove-forming discs 82. These discs 82 are secured together by nuts 90 on threaded ends 91 of the bolts 87, the bolt-heads and nuts contacting directly the outside faces of the first and last groove-forming discs 82. This arrangement gives a very simple structure substantially identical with that shown in Fig. 3 and having the same V-grooves 75, except that the construction of Fig. 7 has the groove-forming discs 82 directly splined upon the drive shaft 15 and thus eliminates the use of a hub.

In the same manner the structure shown by Fig. 8 is similar to the showing of Fig. 3 with the same spacer strips 76 and the same belt grooves 77 adapted to receive the type B V-belts of Fig. 11, and, of course, with no hub such as hubs 24 and 60. Fig. 5 illustrates a construction similar to that of Fig. 8 except that only the interior groove-forming discs 62 are the same as the groove-forming discs 82. In this form of the invention the end discs 92 and 93 are provided with a series of complementarily positioned countersunk openings 94 and 95 respectively, which are adapted to receive the bolt heads 96 and nuts 97. In this form, also, the elements making up the multiple V-belt pulleys are directly splined to the drive shaft 15 and are held together by bolts 98 with the heads 96 and nuts 97 located in counter-sunk recesses in the special groove-forming discs 92 and 93. In this form also a single wide spacer 99 is positioned between pairs of groove-forming discs as between centrally located discs 62 and end discs 92 and 93. These spacers produce a wide form of V-groove 100 which is adapted to receive the larger size of V-belt indicated at C in Fig. 12.

The assemblage shown in Fig. 6 is exactly the same as that of Fig. 5 except that in place of a single thick spacer 99, as used in Fig. 5, the construction of Fig. 6 uses a pair of the narrower spacers 76 employed in the construction of Fig. 4. This gets exactly the same results as with the thick spacer 99 and in most uses may be more desirable, since a single stamping or die casting for the spacer effect may be employed for both the V-groove 79 and the V-groove 100.

In each of the forms of Figs. 3-8 inclusive, the bolts 87 with their heads 89 will be disposed, as shown in Fig. 9, there being a substantial number of such bolts (preferably as shown six thereof) extending through the body portions of the groove-forming discs 82 and of these discs together with any spacer 76 multiples of 76 or thicker spacers 99, which may be used.

In Figs. 13, 14, 15, and 16, a modified form of the invention is disclosed. In this form, referring first to Fig. 13, specially formed discs 101 are provided. These discs are mounted upon hubs 17 or upon complementary hubs 17 and 35, in substantially the same manner as is true of those hubs in the construction illustrated in Fig. 1. Or they may be mounted on a hub 17 and an unflanged extension 17'. The hub members 17 and 35, where the latter is used, are formed likewise with annular flanges 20 and 38, respectively.

Each disc 101 has a cut-out annular portion 23, a protruded annular portion 31, and fits closely upon a hub sleeve 36. They are secured together by bolts 43 and bolts 56 in substantially the same manner as in Fig. 1. The difference resides in the fact that the V-belt grooves are fully formed in the discs 101. These discs preferably have parallel plane walls, preferably with an annular groove portion 102, and have extending down inwardly from their outer circumferential limits 103 an obliquely walled groove 104 formed of inwardly convering side walls 105 and 106 and with cylindrical bottoms 107, as clearly shown in Figs. 13, 14, and 15 and as indicated in dotted lines in Fig. 16.

As shown in Fig. 13, a three groove pulley is constructed mounted upon a single hub sleeve 18 and having the discs 101 forming it, held together by bolts 43 and 56 in substantially the same manner as the groove-making discs 24 of Fig. 1 are held together, it being noted that in Fig. 15 there are a pair of hubs 17 and 35 just as there are a pair of hubs 17 and 35 in the structure of Fig. 1.

In this form of the invention there is a separate and complete groove for each of the discs 101. Hence, in this form of the invention spacers can not be used, but the particular sized groove for a given V-belt must be formed in the discs 101 themselves, which makes it necessary to have as many different groove sizes of discs as there are different sizes of V-belts to be used therewith.

As shown in Fig. 14, a hub extension 17' without any flange such as the flange 38 of the complementary hub 35 of Fig. 1 may be employed. This will simply be a hub cylinder extension 108', of the requisite length for extending the hub to receive the desired number of groove discs 101, which will be engaged over their outer end surfaces by the inner surfaces of nuts 45 on the bolts 43 as shown in Fig. 14, there being a slight spacing indicated at 108 of Fig. 14 between the adjacent annular end portions of the hub 17 and the hub extension 17'. Instead of the nut-head only to engage the outer end of hub cylinder extension 108', a washer 109 under the nut 45 may be employed.

Although in this form of the invention spacers for accommodating different widths of V-belts can not be used, it is none the less true that with a single casting or stamping for any given size of V-belt pulley the number of pulleys can be varied up to any maximum desired. It is also true that while I have shown in all forms of my invention here presented pulley assemblages in which all the pulleys are of the same diameter, none the less in any of the forms of the invention series of pulleys stepped up from a smaller diameter to succeeding larger diameters may readily be obtained by simply using pulley-forming discs or V-groove special discs of successively larger diameter mounted upon the drive hub or the drive shaft, which will give stepped up pulleys of the same extent and efficiency as the single-casting stepped up pulleys now in use.

Other advantages of my invention have quite clearly appeared in connection with the description thereof on the preceding specification. The primary advantage resides in production of multiple V-belt pulleys having any desired number of pulley grooves from a minimum of two up to the maximum number of pulley grooves which are ever required, and accomplishing this through the use of groove-forming discs or grooved discs, so that an entire multiple V-belt gear assemblage may be produced with the use of only a single casting or stamping. In the forms of the invention of Figs. 1–12 there is the further very great advantage of employing the same groove-forming discs with spacers which make possible a production of multiple V-belt pulleys adapted to work with V-belts of different widths.

I claim:

1. In combination with a driven shaft, a multiple V-belt pulley which embodies a multiplicity of V-belt grooves, said pulley comprising a pair of hubs each formed with a drum extension on and contacting throughout its length the said shaft, the inner ends of said extensions being slightly spaced apart, a pair of annular flanges on the hubs at opposite ends of the respective drums, a selected number of discs which provide V-belt disc grooves at their outer circumferential limits, said discs mounted on the drum sections between said flanges, a multiplicity of bolts extending through the bodies of the discs adjacent the drum sections and through the flanges, and a corresponding number of other bolts extending through the bodies of the discs only, all said bolts holding the discs in a firm and unyielding contacting body rotatably connected with the driven shaft through the drum extensions.

2. In combination with a driven shaft, a multiple V-belt pulley which embodies a multiplicity of V-belt grooves, said pulley comprising a pair of hubs each formed with a drum extension on and contacting throughout its length the said shaft, the inner ends of said extensions being slightly spaced apart, a pair of annular flanges on the hubs at opposite ends of the respective drums, a series of groove-forming discs mounted on the drum extensions between the flanges, each disk having a circular outer rim and obliquely disposed belt-contacting faces diverging therefrom, a multiplicity of bolts extending through the bodies of the discs adjacent the shaft and the drum sections and through the flanges, and a corresponding number of other bolts extending through the bodies of the discs only on said bolts holding the discs in a firm relatively immovably contacting body rotatably connected with the driven shaft through the drum extensions.

3. In combination with a driven shaft, a pair of hub parts splined thereon, each having an integral drum extension contacting the shaft throughout its length, each hub part having an outer annular flange, the extensions extending toward each other and being slightly spaced apart at their inner ends, a series of groove-forming discs mounted on the drum extensions, each disc having a cylindrical outer face and obliquely disposed belt-contacting faces diverging therefrom, said discs being of substantial thickness and having radially extensive contacting faces, a multiplicity of bolts extending through the discs and the flanges close to the drum extensions to hold the discs rotatably united therewith, and a second series of bolts extending through the disc bodies adjacent the pulley grooves and having the extended faces of the discs in firm and unyielding lateral contact for rotation with the shafts and drum extensions, whereby adjacent pairs of obliquely disposed faces provide a number of V-belt drive grooves determined by the number of discs on the drum extensions and held in immovable relation in the mass made up of the several discs secured together by the two sets of bolts.

4. In combination with a driven shaft, a series of groove-forming discs on the shaft, each of said discs being of substantial thickness and having a cylindrical outer rim and obliquely disposed belt contacting faces diverging therefrom and having annular radially extensive faces on each side, independent spacing members each having correspondingly annular radially extensive faces contacting adjacent faces of the discs for effecting a broadening of the V-belt grooves by said unchanged discs, and two sets of bolts one of which passes through both said disks and spacers adjacent said shaft and the other of which passes through both said disks and spacers adjacent the groove-forming portions thereof to hold said discs and spacers with their said faces contacting in an unyielding pulley mass and holding the entire pulley mass rotatably connected with the driven shaft.

5. In combination with a driven shaft, a series of groove-forming discs on the shaft, each of said discs being of substantial thickness and having a cylindrical outer rim and obliquely disposed belt contacting faces diverging therefrom and having annular radially extensive faces on each side, independent spacing members each having correspondingly annular radially extensive faces contacting adjacent faces of the discs for effecting a broadening of the V-belt grooves by said unchanged discs, said faces of the respective discs and spacers each extending into complementary annular cut-out and protruded portions positioned toward the driven shaft and contacting and interlocked to aid in holding the discs and spacers together, and two sets of bolts one of which passes through both said disks and spacers adjacent said shaft and the other of which passes through both said disks and spacers adjacent the groove-forming portions thereof to hold said discs and spacers with their faces and the cut-out and protruded portions thereof in a laterally contacting unyielding pulley mass and holding the entire pulley mass rotatably connected with the driven shaft.

6. In combination with a driven shaft, a pair of hub parts splined thereon, each having an integral inward drum extension which contacts the shaft throughout its length, the inner ends thereof being spaced apart, each hub part having an outer annular flange, a series of groove-forming discs on the extensions, each of said discs being of substantial thickness and having a cylindrical outer rim and obliquely disposed contacting faces diverging therefrom and having annular radially extensive faces on each side, independent spacing members each having corresponding annular radially extensive faces contacting adjacent faces of the discs for effecting a broadening of the V-belt grooves by said unchanged discs, a set of bolts extending through the discs and spacers and the flanges adjacent the extensions, and another set of bolts extending through said discs and spacers adjacent the groove-forming portions thereof, all said bolts holding said discs and spacers with their said faces contacting in an unyielding pulley mass and holding the entire pulley mass rotatably connected with the driven shaft.

HOWARD O. WILLIAMS.

REFERENCES CITED

The following references are of record in the file of this patent:

UNITED STATES PATENTS

| Number | Name | Date |
|---|---|---|
| 2,315,301 | Van Deventer et al. | Mar. 30, 1943 |
| 1,765,268 | Hathaway | June 17, 1930 |
| 1,031,106 | Camp | July 2, 1912 |
| 464,705 | Dodge | Dec. 8, 1891 |
| 968,876 | Morrissy et al. | Aug. 30, 1910 |
| 2,104,074 | Erbach | Jan. 4, 1938 |
| 1,792,733 | De Wein | Feb. 17, 1931 |
| 464,795 | Dodge | Dec. 8, 1891 |
| 1,740,087 | Hall | Dec. 17, 1929 |
| 2,036,445 | Torkelson | Apr. 7, 1936 |